S. R. Dummer.
Liquid Measure.

Nº 42,174.        Patented Apr. 5, 1864.

Witnesses;
Lemuel W. Serrell
Thos. Geo. Harold

Inventor;
Saml. R. Dummer

UNITED STATES PATENT OFFICE.

SAMUEL R. DUMMER, OF NEW YORK, N. Y.

IMPROVEMENT IN COMBINED MEASURE AND FUNNEL.

Specification forming part of Letters Patent No. 42,174, dated April 5, 1864.

*To all whom it may concern:*

Be it known that I, SAMUEL R. DUMMER, of the city and State of New York, have invented, made, and applied to use, an Improved Measure and Funnel Combined; and I do hereby declare the following to be a full, clear, and exact description of my said invention, reference being had to the annexed drawings, making part of this specification, wherein—

Figure 1:
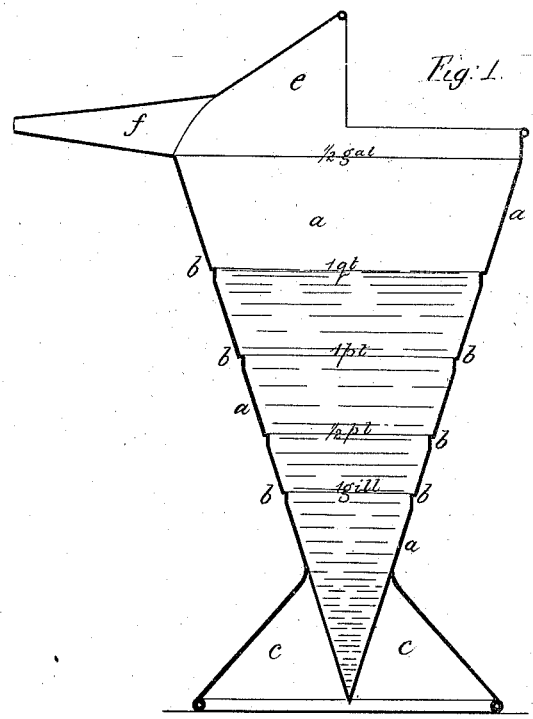
Figure 2:
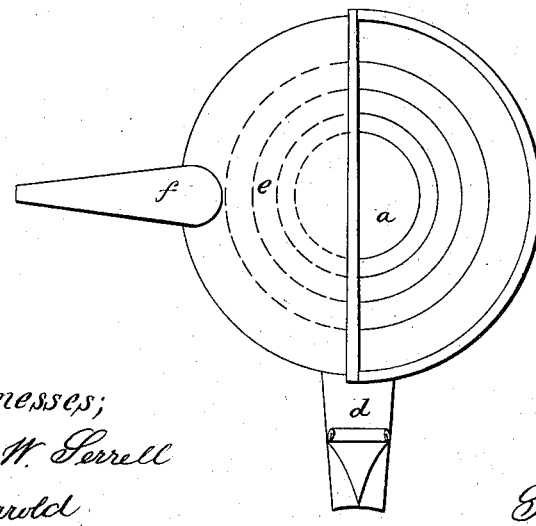

Figure 1 is a vertical section of said measure and funnel combined, and Fig. 2 is a plan of the same.

Similar letters denote the same parts in both figures.

Measures have heretofore been made with creases or corrugations at different places to indicate the various integral parts of said measure, so that various quantities of liquid may be measured in the one vessel, and lips have been made to such vessel from which the contents may be poured.

The nature of my said invention consists in a conical graduated vessel and funnel combined, the same being a new article of manufacture, adapted to measuring various quantities and then pouring the same into a bottle or other vessel without the use of a separate funnel, thus avoiding the trouble of several measures and detached funnels, which are apt to be mislaid.

In the drawings, $a$ is a conical measuring-vessel, with the grooves $b\ b$ at such points as denote quarts, pints, half-pints, gills, &c. This vessel $a$ may be more or less flaring than that shown, and is sustained by a flange or skirt, $c$, and provided with a handle, $d$, upon one side.

$e$ is an arched top, covering about half of the measure, from which a tapering pipe, $f$, extends. This top $e$ and pipe $f$, in connection with the measure itself, form a funnel, from which the contents of the vessel are discharged into a bottle or other receptacle.

By making the grooves $b\ b$ in the form shown the measure will be more easily observed, because the horizontal parts of the metal forming a rib on the inside is similar to the top of a separate measure of the given capacity.

What I claim, and desire to secure by Letters Patent, is—

The conical graduated measure and funnel combined, forming a new article of manufacture, as specified.

In witness whereof I have hereunto set my signature this 11th day of January, A. D. 1864.

SAML. R. DUMMER.

Witnesses:
LEMUEL W. SERRELL,
THOS. GEO. HAROLD.